K. L. SMITH.
FRUIT MARKING APPARATUS.
APPLICATION FILED DEC. 20, 1915.
1,283,579.
Patented Nov. 5, 1918.
3 SHEETS—SHEET 1.
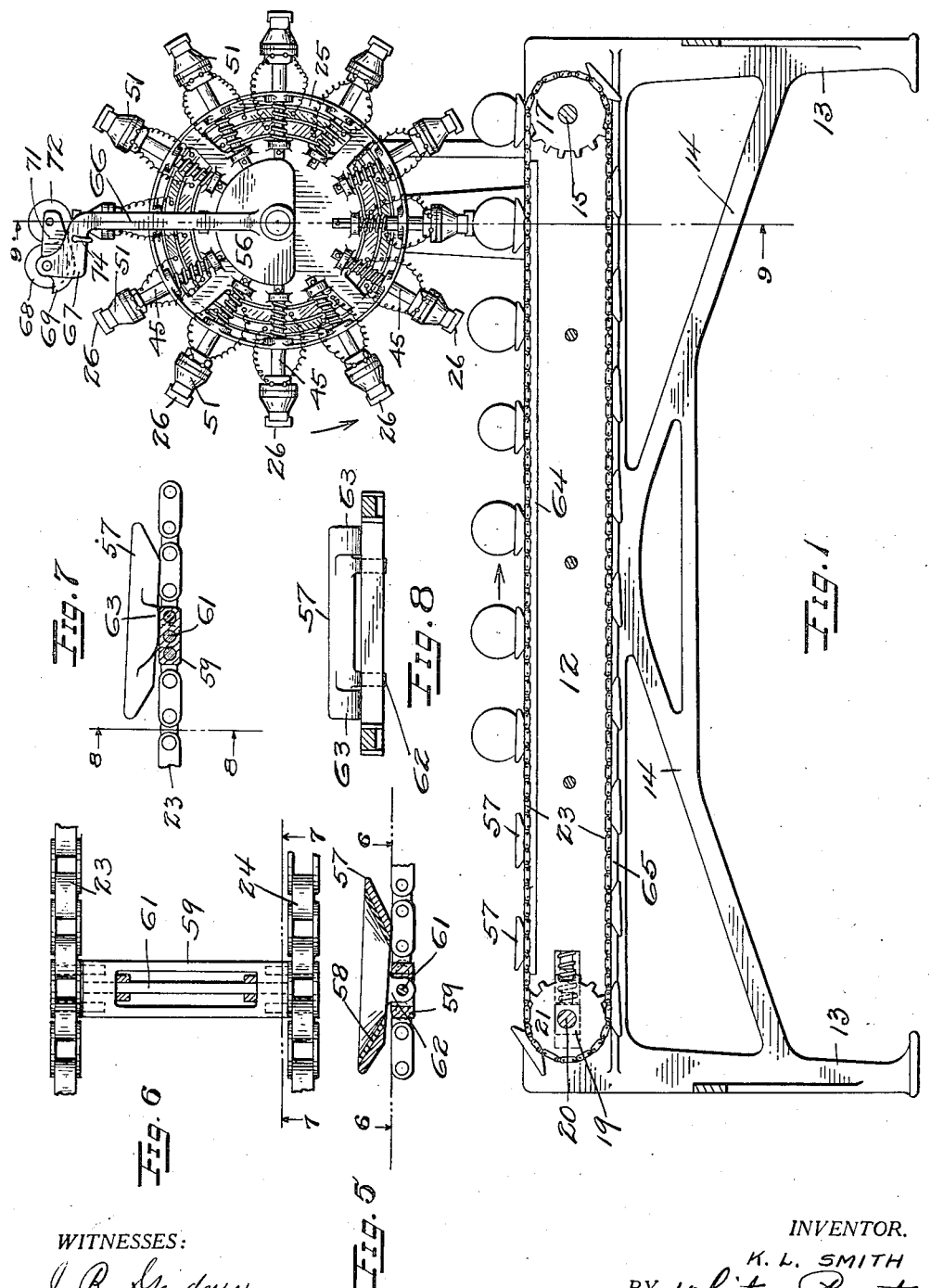
WITNESSES:
J. B. Gardner
INVENTOR.
K. L. SMITH
BY White & Prost
HIS ATTORNEYS.

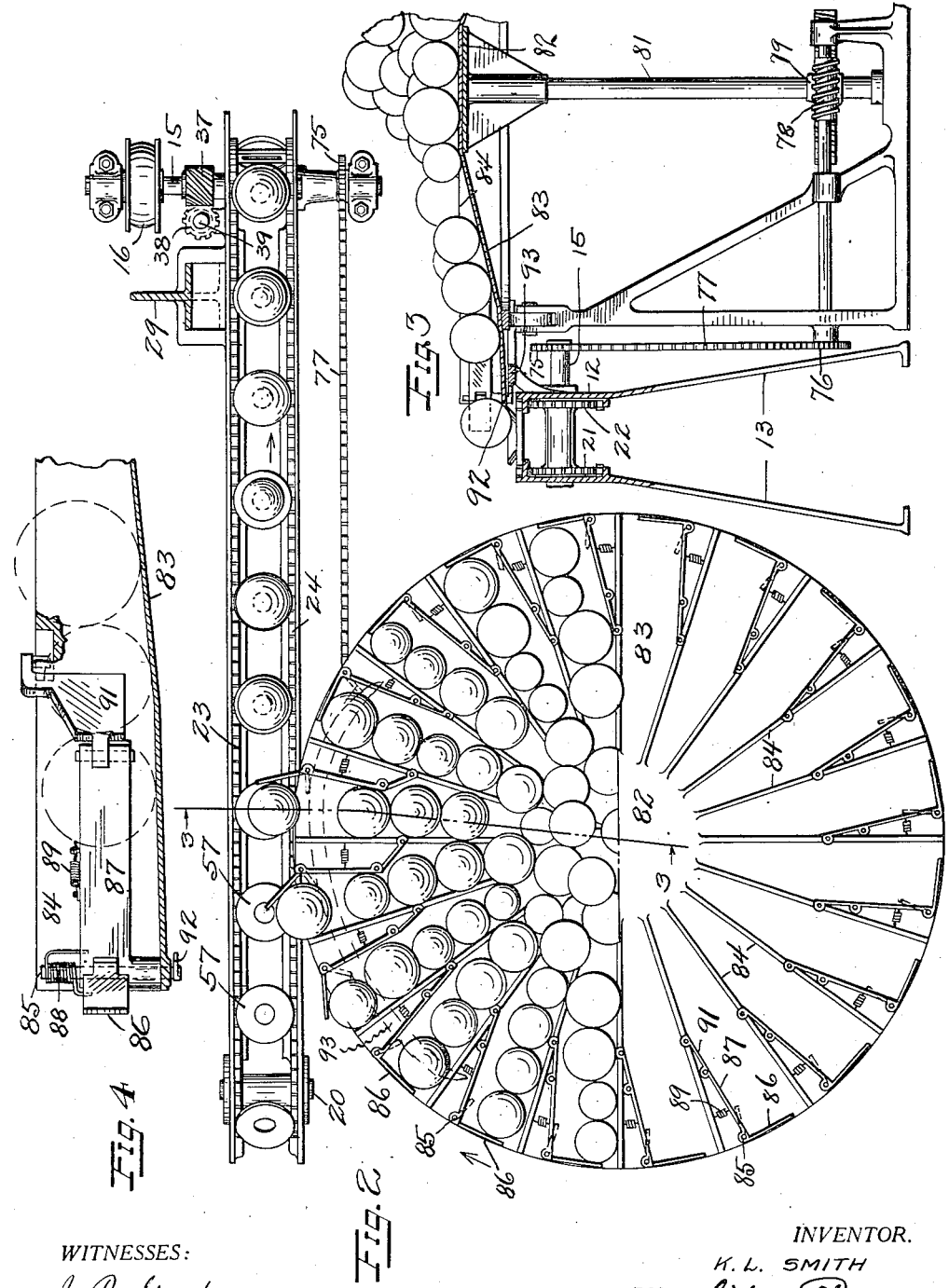

K. L. SMITH.
FRUIT MARKING APPARATUS.
APPLICATION FILED DEC. 20, 1915.
1,283,579.
Patented Nov. 5, 1918.
3 SHEETS—SHEET 3.
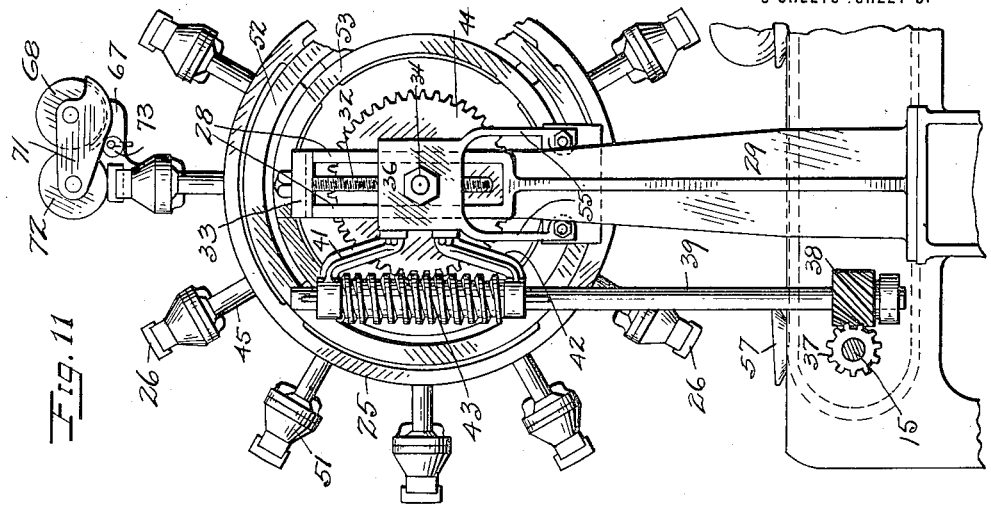
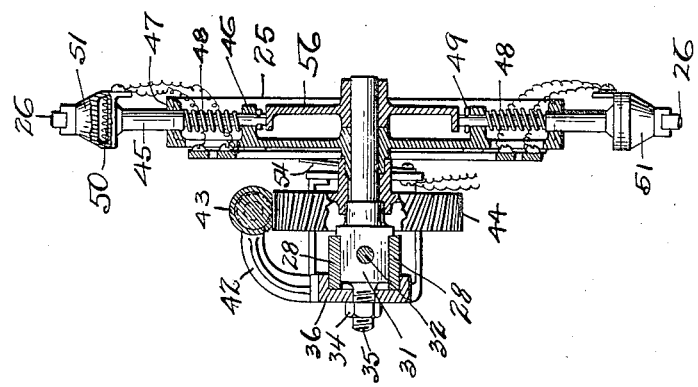
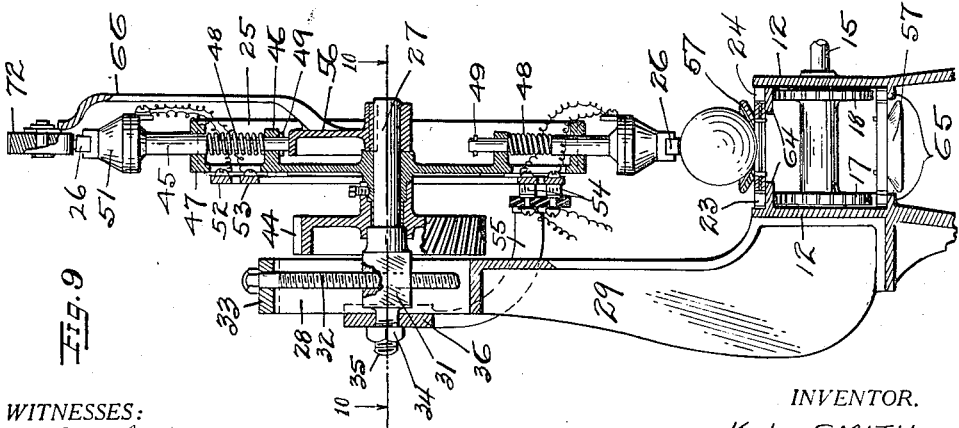
WITNESSES:
J. B. Gardner
INVENTOR.
K. L. SMITH
BY White & Prost.
HIS ATTORNEYS.

UNITED STATES PATENT OFFICE.

KINGSLEY L. SMITH, OF SAN FRANCISCO, CALIFORNIA, ASSIGNOR TO ELECTRIC FRUIT MARKING CO., OF SAN FRANCISCO, CALIFORNIA, A CORPORATION OF CALIFORNIA.

FRUIT-MARKING APPARATUS.

1,283,579.   Specification of Letters Patent.   Patented Nov. 5, 1918.

Application filed December 20, 1915. Serial No. 67,753.

*To all whom it may concern:*

Be it known that I, KINGSLEY L. SMITH, a citizen of the United States, and a resident of the city and county of San Francisco, State of California, have invented a certain new and useful Fruit-Marking Apparatus, of which the following is a specification.

The invention relates to apparatus for marking names, designs or other delineations on fruit.

An object of the invention is to provide an apparatus for marking fruit.

A further object of the invention is to provide an apparatus which accommodates itself to fruit of different sizes.

A further object of the invention is to provide means for feeding the fruit to be marked to the marking mechanism.

The invention possesses other objects and advantageous features, which, with the foregoing, will be set forth at length in the following description, where I shall outline in full that form of the invention which I have selected for illustration in the drawing accompanying and forming part of the present specification. In the drawings, I have shown only one specific form of my generic invention, but it is to be understood that I do not limit myself to such form, because my invention may be embodied in a plurality of forms, each being a species of my said invention within the scope of the claims succeeding the said description.

My invention comprises a die, containing the mark which it is desired to imprint upon the fruit, means for heating the die and means for bringing the fruit momentarily into contact with the hot die. The apparatus is particularly designed for the marking of oranges, grape-fruit, lemons and similar fruit, although it may be employed for marking any fruit capable of being marked. In the description I shall describe the apparatus as operating on oranges, but is is to be understood that it is not limited to such use. The sizes of different pieces of fruit vary and means are provided for accommodating various sized fruits, so that the marks may be impressed thereon under the same conditions. I prefer to employ a plurality of dies which are successively brought into operative position, so that the temperature of the dies may be maintained substantially constant. In marking oranges and similar fruits, it is desirable to apply ink to the hot die before it comes in contact with the fruit and I have provided means for inking the dies. Other features of the apparatus will become clear as the description proceeds.

Referring to the drawings:

Figure 1 is a side elevation of the apparatus of my invention, part thereof being removed to better show the construction.

Fig. 2 is a plan or top view of the apparatus of my invention showing the feeding apparatus, the die wheel being removed.

Fig. 3 is a vertical section taken on the line 3—3, Fig. 2.

Fig. 4 is a vertical sectional detail on a larger scale of a portion of the feeding mechanism.

Fig. 5 is a vertical section of one of the fruit carrying cups and its carrying chain.

Fig. 6 is a section taken on the line 6—6, Fig. 5, showing the cup support.

Fig. 7 is a section of the conveyer taken on the line 7—7, Fig. 6.

Fig. 8 is a section through the conveyer chain taken on the line 8—8, Fig. 7.

Fig. 9 is a vertical section of the die wheel and conveyer taken on the line 9—9, Fig. 1.

Fig. 10 is a horizontal section of the die wheel and its supporting structure taken on the line 10—10, Fig. 9.

Fig. 11 is an elevation of the die wheel end of the machine taken from the opposite side to that shown in Fig. 1.

The apparatus comprises a suitable frame comprising the side plates 12, the legs 13 and braces 14, the side plates being securely held together by suitable bolts and spacing devices. Journaled in the side frames at one end of the machine is a driving shaft 15 to which is secured the sprocket or pulley 16 which is connected by chain or belt to the source of power. Secured to the shaft 15 between the side plates are sprockets 17 and 18. Journaled in longitudinally movable, spring pressed blocks 19 arranged at the other end of the side plates, is a shaft 20 carrying sprockets 21—22 which are alined with sprockets 16 and 17. Engaging the sprockets is a conveyer, preferably consisting of the two chains 23—24, and arranged on the conveyer chains are means for supporting the individual pieces of fruit. The conveyer is driven to cause the fruit to be carried in the direction indicated by the arrow in Fig. 1.

Arranged at the end of the machine toward which the upper run of the endless conveyer is driven, is a wheel 25, carrying on its periphery a plurality of dies 26 which are brought into contact with the fruit on the conveyer. The wheel is journaled on the shaft 27 which is mounted for vertical adjustment in the guide ways 28 formed on the supporting bracket 29. The shaft 27 is provided on its end with a block 31 which fits between the guide ways 28 and extending through the block is a screw 32 which passes through the plate 33 joining the guides at the top. Rotation of the screw causes the shaft to be raised or lowered, thereby varying the distance between the dies and the conveyer belt. This adjustment is desirable on account of the wide variation in the size of fruit, oranges varying from five inches to two inches in diameter. The shaft is clamped in adjusted positions by the nut 34 on the screw 35 which is formed integral with the block 31. The screw 35 extends through the clamping plate 36 engaging the guides 28 and by tightening the nut 34, the shaft is clamped in position.

The die wheel is driven from the driving shaft 15, so that the dies move at substantially the same speed as the conveyer and the dies are arranged so that they register with the fruit carrying cups on the conveyer. The shaft 15 is provided with a skew gear 37 which is engaged by a skew gear 38 on the vertical shaft 39, which shaft is supported at its upper end in brackets 41—42 secured to the clamping plate 36. Splined to the shaft 39 and arranged between the brackets 41—42 is a worm 43 which engages a worm wheel 44 mounted on shaft 27 and attached to the hub of the die wheel 25. During vertical adjustment of the shaft 27 the worm 43 slides on shaft 39 without causing a rotation of the die wheel and the relation between the dies and the fruit supports on the conveyer is not disturbed.

The die wheel is provided with a plurality of radially disposed spokes 45, bearing in the circular flanges 46—47 on the wheel. The spokes are radially movable and are spring pressed outwardly by springs 48 bearing against the inner flange 46 and shoulders on the spokes. A pin 49 driven through each spoke prevents the spoke from moving out of engagement with the inner flange 46. Secured to the end of each spoke is a casing 51 containing an electric heating element 50 and tightly secured to the outer end of each casing is the die 26. Secured to the die wheel and insulated therefrom, are collector rings 52—53 which are connected to the heating elements, the heating elements being preferably arranged in parallel. Current is supplied to the collector rings 52—53 by brushes 54, supported on the arms 55 which are secured to the clamping plate 36. The springs 48 are not of sufficient strength to support the spokes against downward movement when they are in inverted position at the top of the wheel and means are provided for preventing a downward movement of the spokes when they are in such position. Secured to the shaft 27 is a plate 56 having an upper surface concentric with the axis of rotation of the wheel. As the wheel rotates, the inner ends of the spokes lying at the upper portion of the wheel contact with the plate 56 which operates to hold them outward in their extreme position. As the spokes move downwardly they move out of contact with the plate, so that those spokes lying below the axis of rotation are capable of radial movement.

The sizes of the pieces of fruit being marked vary and the spokes are made radially movable to accommodate these varying sizes. The apparatus is set to accommodate a certain minimum diameter of fruit and fruit larger than this size, when coming in contact with the die will cause the spoke to be pushed into the wheel. In practice, I have limited the radial movement of the spokes to one and one-half inches and size the fruit before it is fed to the apparatus, so that only fruit having a maximum variation of one and one-half inches is fed. By adjusting the position of the die wheel with relation to the conveyer, the limits of the variation in size are varied.

The driving connections between the conveyer and the die wheel are such that the dies move at the same speed as the conveyer when the spokes are in their outward position. When the spoke is depressed by the contact of the die with a large orange, the radius about which that particular die is moving is shortened and consequently, that die, when in contact with the orange, moves at a slower speed than the conveyer. It is essential that there be no relative movement of the die and the orange when they are in contact, or the mark on the orange will be indistinct and blurred and means are provided for overcoming this difference in speed.

The individual oranges are carried in conically formed cups 57 attached to the conveyer chains and the cups are mounted on the chains so that they are capable of backward rocking movement, so that the speed of the orange when in contact with the die may be slowed down. The cup is provided with a lining 58 of rubber or comparable material, which serves to grip the orange and prevent it from rotating in the cup, when the orange is in contact with the die. Secured to the chains at suitable spaced intervals are saddles 59, in which are arranged shafts 61 to which the cups are pivoted. The cups are provided on their under sides, offset from the center with ears 62 which engage the shafts 61, the offset position of the ears causing the cups to tilt forward. The amount of this forward tilting is controlled by lugs 63 cast on the sides of the cup and engaging the saddle 59. The oranges are placed in these tilted cups and are carried therein to the dies. The upper run of the conveyer chains is supported by track ways 64 formed on the side plates 12 and the lower run of the conveyer is supported by the lower trackways 65. As an orange comes into contact with the die, causing a depression of the spoke, the engagement of the slower moving die tends to halt the orange, thereby causing the cup to tilt backward a sufficient amount to produce the same speed of movement of orange and die. This is one method by which the relative speeds of the die and orange may be regulated. The die preferably has a flat face, so that the die practically rolls over the orange, the leading end of the die contacting with the orange first, and the remaining portion of the die coming into contact as the conveyer and die wheel move. After being marked, the oranges are discharged from the cups into suitable bins or conveyers.

In marking oranges, it is desirable to apply a colored ink to the dies, since the mark so made is more decorative and attractive than that made by the bare die, and means are provided for applying ink to the dies. Secured to the plate 56 is an arm 66 which extends upwardly to a position above the die wheel and supported on this arm is the inking apparatus. The inking apparatus is thus placed so that it is engaged by the dies, when the die carrying spokes are held outward by the plate 56, thereby insuring a proper contact between the dies and the inking roller. The arm 66 is provided with an offset 67 at the top and journaled in such offset is an ink distributing roller 68 partly disposed in an ink containing cup 69 which is supported on the shaft of roller 68. The opposite sides of the cup are extended to form brackets 71 in which the inking roller 72 is journaled, the two rollers being arranged so that they are in contact. The inking roller 72 is made of soft material which is not deleteriously affected by the momentary contact of the hot dies. The contact between the moving dies and the inking roller causes both rollers to rotate and insures the proper supply of ink to the inking roller. Means are provided for moving the inking roller out of the path of the dies when the die wheel is not rotating or when no oranges are being fed through the machine. Journaled in the offset 67 is an eccentric 73 which is rotated by a handle 74 and in one position the high part of the eccentric engages one of the brackets 71 and moves the bracket to lift the inking roller. In its other position the low part of the eccentric holds the roller in the path of the dies.

Means are also provided for feeding oranges to the cups or holders of the conveyer, this portion of the mechanism being shown in Figs. 2, 3 and 4. Arranged adjacent to the conveyer and to one side thereof, is a rotating table which is rotated at such speed that the periphery thereof moves in time with the conveyer. The table may be rotated from the drive shaft 15 through the sprockets 75—76, the chain 77 and the worm 78 and worm wheel 79 secured to the central shaft 81 of the table. The table is circular in shape and preferably has a flat, central portion 82 and a downwardly inclined annular or marginal portion 83. The inclined portion of the table is provided on its upper surface with a plurality of radially disposed walls 84 which form run ways for the oranges which are placed on the center of the table. The top edges of the walls are preferably level and are disposed in the plane of the central flat portion of the table so that run ways of gradually increasing depth outwardly are formed. The oranges roll from the center of the table into the runways whence they are singly discharged into the cups 57.

Arranged in the table at the end of each runway and to one side of the center thereof, is a pin 85 to which is attached a gate 86 which normally holds the oranges in the runway. Pivotally mounted on the pin and extending into the runway is a holding plate 87, which is connected to the gate by a spring 88 surrounding the pin, so that outward movement of the gate causes the movement of the holding plate to clamp the orange behind the leading one in the runway. The holding plate is normally held in a backward position by the spring 89. Means are also provided for preventing the entrance of an orange behind the holding plate when it is moved forward. Pivoted to the inner end of the holding plate and slidably engaging the adjacent wall, is a baffle plate 91 which prevents the entrance of oranges behind the holding plate. Secured to the lower end of the pin 85 is a finger 92 which is arranged to contact with a fixed cam 93 arranged below the table, to move the gate open as the end of the runway moves into registry with a cup 57. As the runways approach the conveyer, their respective gates are opened to deposit an orange in the cup and while the gate is open, the holding plate clamps the succeeding oranges in the runway. The peripheral spacing of the runways is the same as the spacing of the cups on the conveyer and the peripheral speed of the runways is the same as the speed of the conveyer, so that the oranges are regularly deposited in the cups.

I claim:

1. In an apparatus of the character described, a die for marking fruit, a conveyer arranged adjacent said die and means for supporting the fruit to be marked pivoted upon said conveyer below the points of contact of said means with said fruit.

2. In an apparatus of the character described, a conveyer, cups pivotally attached to the conveyer to one side of the plane passing through the center of gravity of the cups transverse to the direction of motion of the conveyer and a rotatable die wheel arranged adjacent to said conveyer and movable in time therewith.

3. In an apparatus of the character described, a conveyer, a plurality of cups pivoted below their center of gravity on said conveyer, means movable in time with the conveyer for placing fruit in said cups and means for marking the fruit in the cups.

4. In an apparatus of the character described, a conveyer, cups pivoted below their center of gravity on said conveyer and a die for marking the fruit in said cups.

5. In an apparatus of the character described, a conveyer, cups pivoted to said conveyer, means on the conveyer for limiting the movement of the cups in respect of the conveyer, means for placing fruit in said cups, and means for marking the fruit in the cups.

6. In an apparatus for marking fruit, a conveyer, cups pivoted to the conveyer to one side of the plane passing through the center of the cups transverse to the direction of motion of the conveyer, and means for marking the fruit in the cups.

7. In an apparatus of the character described, a conveyer, conical cups for holding fruit to be marked pivoted to said conveyer, a rotatable die wheel arranged adjacent to said conveyer and dies on said wheel adapted to be brought in rolling contact with said fruit.

8. In an apparatus for marking fruit, a conveyer, cups pivoted below their center of gravity to said conveyer, means for feeding fruit to said cups, and means for marking said fruit.

9. In an apparatus of the character described, a variable speed die, a conveyer arranged adjacent said die, a cup on said conveyer, and means for permitting a variation in the speed of the cup to conform to the speed of the die.

10. In an apparatus of the character described, a die wheel provided with variable speed dies, a conveyer arranged adjacent said die, cups on said conveyer, and means for permitting a variation in the speed of the cups to conform to the speed of the dies.

11. In an apparatus for marking fruit, a die adapted to be moved at a variable speed, a conveyer for bringing said fruit into contact with the die, means on the conveyer for holding the fruit and means for permitting a variation in the speed of said holding means to conform to the speed of the die.

In testimony whereof, I have hereunto set my hand at San Francisco, California, this 8th day of December, 1915.

KINGSLEY L. SMITH.

In presence of—
H. G. PROST.